(No Model.)
L. D. HURD.
THREE WHEELED VEHICLE.
No. 245,832. Patented Aug. 16, 1881.
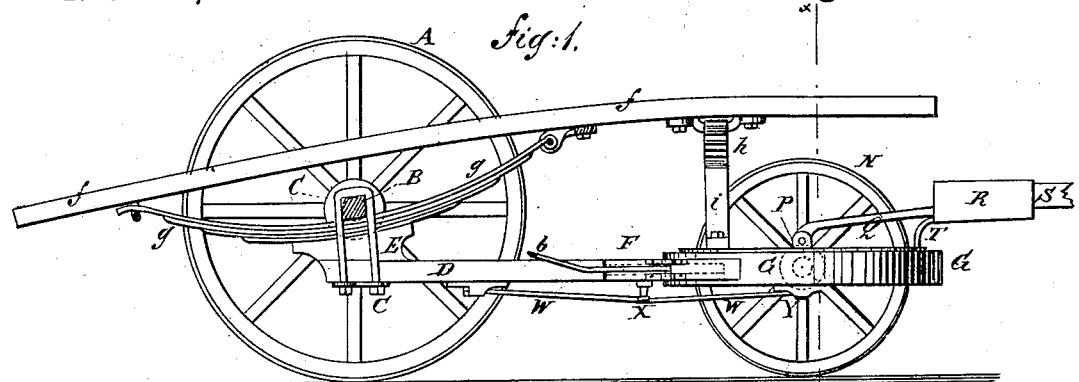
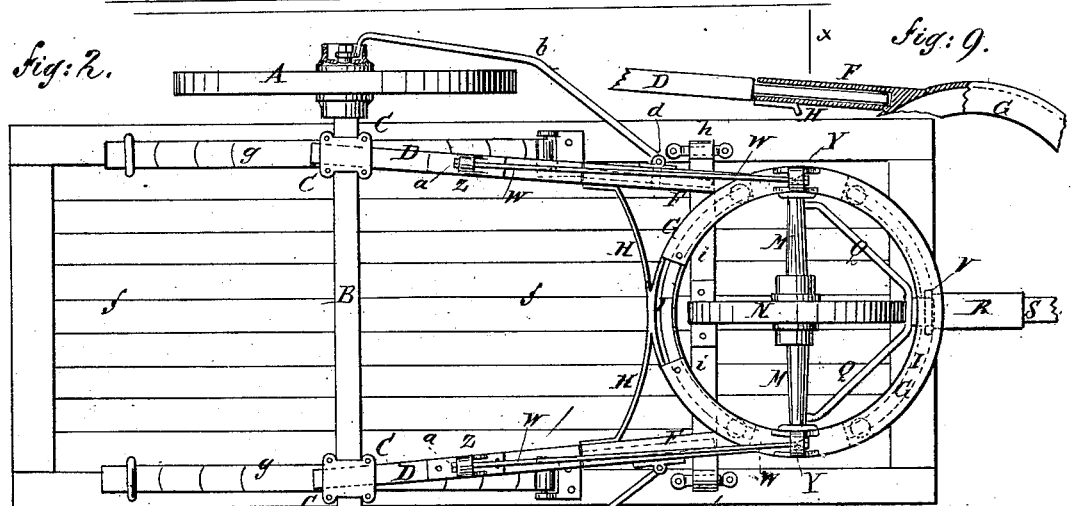
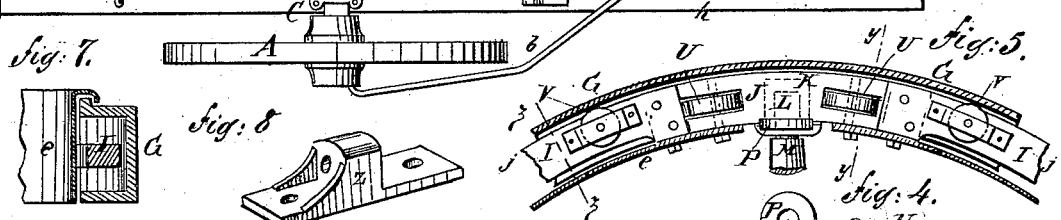
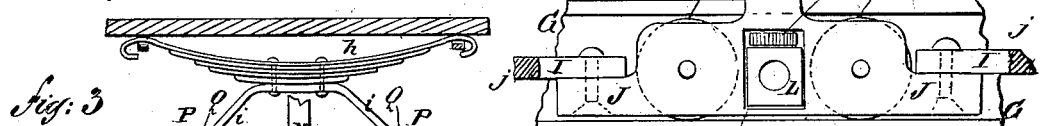
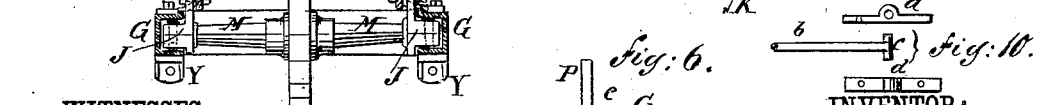
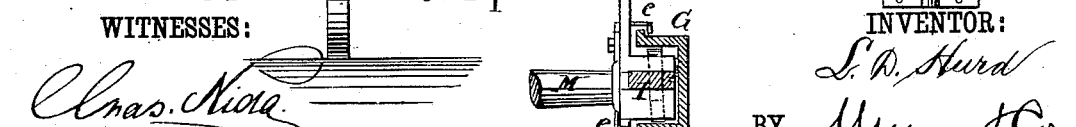
WITNESSES:
Chas. Niola
C. Sedgwick
INVENTOR:
L. D. Hurd
BY Munn & Co
ATTORNEYS.

UNITED STATES PATENT OFFICE.

LORENZO D. HURD, OF WELLSVILLE, NEW YORK.

THREE-WHEELED VEHICLE.

SPECIFICATION forming part of Letters Patent No. 245,832, dated August 16, 1881.

Application filed December 13, 1880. (No model.)

*To all whom it may concern:*

Be it known that I, LORENZO D. HURD, of Wellsville, in the county of Allegany and State of New York, have invented a new and useful Improvement in Three-Wheeled Vehicles, of which the following is a specification.

Figure 1 is a sectional side elevation of the improvement. Fig. 2 is an under-side view. Fig. 3 is a sectional end elevation taken through the line *x x*, Fig. 1. Fig. 4 is an elevation of a part of the mechanism that connects the third wheel with the frame-work of the vehicle. Fig. 5 is a sectional plan view of the mechanism shown in Fig. 4. Fig. 6 is a sectional elevation taken through the line *y y*, Fig. 5. Fig. 7 is a sectional elevation taken through the line *z z*, Fig. 5. Fig. 8 is a perspective view of one of the lugs for holding the end of a truss-rod. Fig. 9 is a sectional plan view, showing the connection between the outer circle and the side bars. Fig. 10 shows the hinge for connecting the fender-rods with the frame.

Similar letters of reference indicate corresponding parts.

The object of this invention is to furnish three-wheeled vehicles so constructed that the vehicles can be turned in small space, that the whipping of the tongues will be prevented, and that the vehicles will not be liable to tip over should the loading be unevenly placed upon them.

In the accompanying drawings, A are the rear wheels, and B is the rear axle, which axle may be made straight or crank-shaped, as may be desired.

To the axle B are rigidly secured, by U-bolts C or other suitable means, the rear ends of the side bars, D, blocks E being interposed between the said axle and side bars, when required, to bring the side bars into the desired position. The side bars, D, incline inward slightly, and their forward ends are inserted in sockets F formed upon the rear side parts of the circle G, which sockets F are strengthened by a curved brace, H. The end parts of the brace H are connected with the sockets F, and its middle part is connected with the rear side of the circle G. The circle G, sockets F, and brace H are designed to be cast in one piece. The circle G is formed of a band having inwardly-projecting ring-flanges along its upper and lower edges, to form a ring-groove to receive the inner wheel or circle, *j*. The middle rear part of the lower flange of the circle G is cut away, as shown in Fig. 2, for convenience in inserting the inner wheel or circle, *j*, which opening is designed to be closed by a cap-plate bolted to the said flange, as indicated by the holes shown in Fig. 2. The inner circle is formed of two curved bars, I, each less than a semicircle, the ends of which are secured by bolts or rivets to the ends of two curved bearing-blocks, J.

In the inner sides of the bearing-blocks J are formed square recesses K, as shown in Fig. 4, extending nearly through the said bearing-blocks J, as shown in dotted lines in Fig. 5.

In the recesses K are placed the bearings L, in which the journals of the axle M revolve.

To the center of the axle M is attached, or upon it is formed, the third wheel, N.

In the upper part of the recesses K, above the bearings L, are placed rubber blocks O, or other suitable springs, to give a slight play to the third wheel, N.

To the upper part of the inner side of each bearing-block J is attached, or upon it is formed, a lug, P, which projects upward across the inner edge of the top flange of the outer or stationary circle, G.

To the upwardly-projecting ends of the lugs P are secured, by bolts or rivets, the rear ends of the tongue hounds or braces Q, the forward ends of which are secured to, or formed upon, the socket R, that receives the rear end of the tongue S.

Upon the socket R is formed, or to it is attached, the forward end of a brace-bar, T, the rear end of which is secured to a lug formed upon the middle part of the forward bar, I, of the inner circle, *j*. With this construction the third wheel, N, will be turned by the movement of the inner circle, *j*, within the cavity or groove of the outer circle, G, as the said inner circle, *j*, is turned by the tongue S.

In slots in the end parts of the bearing-blocks J are pivoted vertical wheels U, the faces of which project a little above and below the said bearing-blocks J, and which are made of a diameter a little less than the distance between the inner surfaces of the flanges of the outer circle, G, so that when the circle G is pressed down by the weight of the vehicle or its load, or is forced upward by the uneven distribution of the load, or other cause, the wheels U will roll along the inner surfaces of the flanges of the said circle G, and will lessen the friction so that the inner circle, j, can be turned easily to guide the vehicle.

To the upper or lower sides of the ends of the curved bars I, and of the center of the forward bar, I, are pivoted small horizontal wheels V, the faces of which project at the outer sides of the said bars I, to rest against the inner surface of the band of the outer circle, G, and take the draft-strain, so that the inner circle, j, can be readily turned to guide the vehicle when under a draft-strain.

The side bars, D, and the outer circle, G, are strengthened against the downward pressure of the load by the truss-rods W, the middle parts of which bear against blocks X, of wood or other suitable material, interposed between them and the side bars, D. The truss-rods W pass through lugs Y, formed upon the side parts of the lower side of the outer circle, G, and have heads formed upon their forward ends to rest against the forward sides of the said lugs Y. The rear ends of the truss-rods W pass through holes in the lugs Z, secured to the under sides of the rear parts of the side bars, D. The rear ends of the truss-rods W have screw-threads cut upon them to receive the nuts a, which rest against the rear sides of the lugs Z, so that the said truss-rods W can be put under any desired pressure by turning the nuts a in one or the other direction.

b are brace and fender rods, the rear ends of which are bent inward to enter the mud-bands upon the outer ends of the hubs of the wheels A, and are then bent to the rearward, and have eyes formed in them to receive the ends of the axle B. The brace and fender rods b incline inward slightly until they have passed the rims of the wheels A, and then incline inward more sharply until their forward ends nearly come in contact with the outer sides of the sockets F. The forward ends of the rods b have cross-head pivots c formed upon them, or pivots passed through them, to work in holes in the lugs d, the base-plates of which are attached to the outer sides of the sockets F. The pivots c and the lugs d thus hinge the forward ends of the brace and fender rods b, so that the rear ends of the said rods can be swung outward to allow the wheels A to be removed from the axle B. The rods b serve as fenders to prevent the hubs of the wheels A from striking against vehicles or other obstructions; but their especial use is to serve as braces to strengthen the frame of the vehicle. The open inner side of the circle G is covered, and the entrance of mud and dust into the cavity of the said circle is prevented by a ring-guard, plate, or apron, e, which is attached to the lugs P that support the tongue-braces Q T. The upper edge of the guard e is bent over to overlap a flange or lip formed upon the upper side of the inner edge of the top flange of the wheel G, as shown in Fig. 7.

f is the platform or body of the vehicle, the rear and middle parts of which are supported by springs g, the ends of which are shackled to the said platform f, and their middle parts are clipped or otherwise secured to the axle B. The forward part of the platform or body f is supported by a cross-spring, h, the ends of which are shackled to the body f, and its middle part is clipped, bolted, or otherwise secured to the middle part of the arched bar i. The ends of the arched bar i are bolted to the opposite sides of the circle G. With this construction the frame-work is rigid, so that it cannot tip toward either side, and will support the load without being liable to tip over, thus rendering the construction of a three-wheeled vehicle practical.

Having thus described my invention, I claim as new and desire to secure by Letters Patent—

1. In a three-wheeled vehicle, the combination, with the axle B and the side bars, D, of the blocks E and braces b, substantially as herein shown and described, to strengthen the connection between the axle and side bars and hold the frame against lateral tilting, as set forth.

2. In a three-wheeled vehicle, the inner circle, j, constructed of the bearing-blocks J, recessed to receive the third-wheel bearings L, and the curved bars I, substantially as herein shown and described, to adapt the said inner circle to work in the outer circle for turning and guiding the vehicle, as set forth.

3. In a three-wheeled vehicle, the bearing-blocks J, constructed with tongue-lugs P, friction-rollers U, and recesses K, to receive the axle-bearings L between the friction-rollers U, substantially as herein shown and described.

4. In a three-wheeled vehicle, the combination, with the inner circle, j, and the bearings L, of the springs O, substantially as and for the purpose described.

5. In a three-wheeled vehicle, the sockets F, formed upon the outer circle, G, to receive the side bars, D, substantially as herein shown and described, whereby a firm and rigid connection is formed between the said circle and side bars, as set forth.

LORENZO D. HURD.

Witnesses:
HENRY JOHNSON,
HUGH H. SHAW.